Aug. 4, 1964   J. J. HEIGL   3,143,404
GAS CHROMATOGRAPHY COLUMNS
Filed Sept. 30, 1960
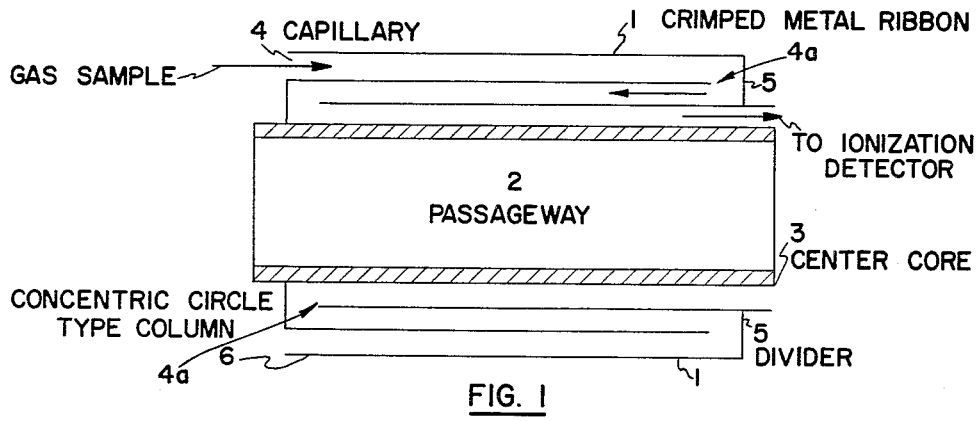
FIG. I
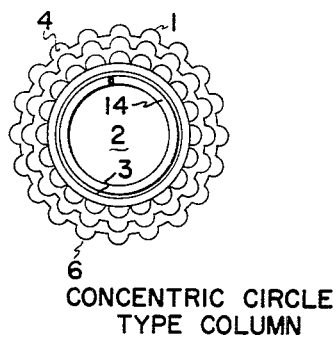
FIG. 2
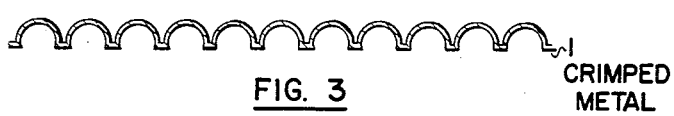
FIG. 3
John J. Heigl   Inventor
By W. O. Heilman
Patent Attorney

United States Patent Office 3,143,404
Patented Aug. 4, 1964

3,143,404
GAS CHROMATOGRAPHY COLUMNS
John J. Heigl, Short Hills, N.J., assignor to Esso Research and Engineering Company, a corporation of Delaware
Filed Sept. 30, 1960, Ser. No. 59,588
3 Claims. (Cl. 55—208)

The present invention is concerned with a column for separating gaseous mixtures. More particularly the invention is concerned with a metal column consisting of a series of small capillaries, coated with an organic agent for use in gas chromatography. In its specific aspects, the invention is concerned with a gas chromatography column consisting of a series of vertically oriented capillaries formed by wrapping ribbed or crimped metal ribbon around a center core, which capillaries are coated with a liquid or solid organic agent making the selective separation of gaseous hydrocarbons and other organic gases possible.

Previous gas chromatography columns consisted of single tubular packed columns or tubular capillaries immersed in a temperature control bath. In the present invention, a temperature control fluid is passed through a cylindrical passageway in the core of the column, heat being transferred through the core and ribbon to the gaseous medium.

Another aspect is that the gas chromatography column of the present invention is adaptable to electrical heating. In one embodiment, the center core may be an electrical heater. In another embodiment, direct resistance heating may be used by passing a low voltage (about ¼ volt), high amperage (about 30 amperes) electrical current through the column. An efficient method of uniformly heating the chromatography column is provided.

In a tubular column the organic separating agent must be packed in carefully. In the tubular capillary, due to its size, a liquid organic agent must be forced through the capillary. Heating one end of the capillary then leaves a thin film of the agent on the capillary walls. In the present invention, the organic agent may be applied directly to both sides of the ribbon and the outside of the core prior to assembly.

To obtain good resolution in a gas chromatography column, capillaries of extremely long length are not uncommon. It is an object of the present invention to provide a compact column with an effective column length of 100–500 feet. This is attained by interconnecting the concentric circular rows of capillaries. Thus, the effective column length can be varied by changing the ribbon width and/or the number of concentric circular rows of capillaries. Depending on the substrate and the gas sought to be analyzed, it may be desirable to vary the overall column length. This may be readily accomplished under this aspect of the present invention.

The invention may be more fully understood by referring to the illustration showing several adaptations of the same.

FIG. 1 is a cutaway view of cylindrical columns employing concentric circular rows of capillaries, the center core having a temperature control fluid passageway.

FIG. 2 is a cross-sectional view of the cylindrical columns in FIG. 1.

FIG. 3 is a side view of the crimped metal ribbon used in a column.

Referring to the illustrations in more detail, FIGURE 1 illustrates the rows of capillaries 4, of the concentric circle type column 6. A temperature control fluid such as water flows through passageway 2 of the cylindrical center core 3 thereby enabling the separation to occur at a controlled temperature. The core 3 may be stainless steel tubing. The number of concentric circular rows of capillaries depends on the width of ribbon 1 and the desired overall column length which may be 100–500 feet. The concentric rows of capillaries 4 are interconnected by means of metal dividers 5 which may be crimped to fit snugly on the ribbon 1 and then soldered or otherwise suitably attached to ribbon 1 so as to seal off the rows of capillaries 4 with respect to the exterior of the column. However, as shown in FIGURE 1, it will be noted that alternate ones of the concentric ribbons 1 extend beyond the ends of intermediate ribbons which creates a passage 4a between the capillaries 4 of adjacent ribbons. Dividers 5 may be made of the same metal as ribbon 1 and sealingly connect the ends of the alternate, longer ribbons 1 as shown to define the passage 4a with respect to the exterior of the column.

FIGURE 1 shows the gas flow from the outer row of capillaries 4 toward the center core 3. However, it may be desirable to initiate the gas flow into column 6 in the row of capillaries 4 adjacent to the center core 3, the gas flowing away from the core 3 as it passes through column 6. FIGURE 1 is not intended to be restrictive as to the direction of flow or the number of rows of capillaries.

FIGURE 1 further illustrates the concentric rows of capillaries 4 interconnected so that the gas flows from one row of capillaries 4 to the next adjacent row, etc. Thus, as shown there is one row per pass. However, it may be seen that the outer row will contain a greater number of capillaries than those rows nearer center core 3. To achieve efficient distribution of gas throughout column 6 it is desirable to increase the number of rows per pass as the flow area per row decreases. Thus, FIGURE 1 is not intended to restrict the flow pattern in column 8.

FIGURE 2 illustrates the crimped metal ribbon 1, wound to form concentric circular rows of capillaries 4.

FIGURE 3 is an illustration of crimped metal ribbon 1 used to form capillaries 4 by winding the ribbon 1 around a center core 3. The crimped ribbon 1 shown is greatly enlarged. The ribbon 1 would normally be crimped to form capillaries having a cross-sectional area of .0000785 square inch. This is equivalent to a circular capillary of .01 inch in diameter. The cross sectional area of the capillaries 4 formed by winding crimped ribbon 1 around center core 3 may vary between .00000625 square inch and .0004 square inch. It is desirable to keep the capillary size quite small so as to obtain good resolution.

The type of metal ribbon 1 used need not be restricted. However, stainless steel is a typical example of the metal that could be used to form capillaries 4.

With the concentric circle type column 6 an electric heater or fluid can be used to heat the column. In FIGURE 1 passageway 2 is used to pass a temperature control fluid through the column 6. Center core 3 can also house a commercially available electrical heater 14 as shown in FIGURE 2. Also, column 6 may be insulated with commercially available insulating material so as to minimize the temperature gradient from the center to the outside of the column.

In gas chromatography columns a substrate is coated on the capillary walls to separate the gas components. The whole system is under inert gas pressure and the gas to be analyzed is bled into the system. The gas components may be identified by using a gas ionization detector or other suitable means. With extremely long capillaries good resolution is obtained because the longer the column the more stages there are in which the gas may be separated. With the present invention it is sought to provide an efficient and flexible capillary gas chromatography column which is adaptable to the use of either polar or boiling point substrates, depending on the type of separation sought to be obtained. Further-more, the present invention may be used with any inert gas pressuring system.

The drawings in FIGURES 1-3 are not to scale but show the capillaries greatly enlarged so as to illustrate the many aspects of the present invention.

Having described this invention, what is sought to be protected by Letters Patent is set forth in the following claims.

What is claimed is:

1. A gas chromatography column comprising a series of thin, metal-ribboned tubes concentrically arranged and spaced uniformly within each other, each tube defining by crimped wall portions thereof a plurality of capillaries lengthwise of said tube having a cross-sectional area between .00000625 and .0004 square inch, said capillaries having an organic agent suitable for use in gas chromatography as a thin film on the capillary walls, a hollow tubular center core located concentrically within said capillary tubes, alternate ones of said capillary tubes extending lengthwise beyond the end of an intermediate tube to provide communication between the spaces between adjacent tubes and continuous communication between each of said tubes, radial annular sealing members connecting the ends of said alternate capillary tubes, the outermost and innermost pairs of tubes defining openings for the passage of gas longitudinally through said series of tubes.

2. The column according to claim 1 in which a heating means is arranged within said core.

3. The column according to claim 2 in which said heating means is an electrical heating element.

References Cited in the file of this patent

UNITED STATES PATENTS

| | | |
|---|---|---|
| 813,918 | Schmitz | Feb. 27, 1906 |
| 1,932,406 | Harris | Oct. 31, 1933 |
| 2,038,071 | Wilhelm | Apr. 21, 1936 |
| 2,317,951 | Burk | Apr. 27, 1943 |
| 2,375,661 | Karmayin | May 8, 1945 |
| 2,756,032 | Dowell | July 24, 1956 |
| 2,831,549 | Albert | Apr. 22, 1958 |
| 2,920,478 | Golay | Jan. 12, 1960 |
| 3,009,045 | Porter | Nov. 14, 1961 |
| 3,049,909 | Thomas | Aug. 21, 1962 |